United States Patent
Malec et al.

(10) Patent No.: US 10,379,907 B2
(45) Date of Patent: Aug. 13, 2019

(54) EVENT-DRIVEN SYSTEM AND METHOD FOR SELECTIVELY PERFORMING COMPUTATIONS

(71) Applicant: Change Healthcare Holdings, LLC, Nashville, TN (US)

(72) Inventors: Arien Malec, Oakland, CA (US); Chris Patterson, Oakland, CA (US)

(73) Assignee: CHANGE HEALTHCARE HOLDINGS, LLC, Nashville, TN (US)

(*) Notice: Subject to any disclaimer, the term of this patent is extended or adjusted under 35 U.S.C. 154(b) by 93 days.

(21) Appl. No.: 15/080,668

(22) Filed: Mar. 25, 2016

(65) Prior Publication Data

US 2017/0277565 A1    Sep. 28, 2017

(51) Int. Cl.
G06F 9/46    (2006.01)
G06F 9/50    (2006.01)

(52) U.S. Cl.
CPC ............ *G06F 9/505* (2013.01); *G06F 9/5033* (2013.01)

(58) Field of Classification Search
None
See application file for complete search history.

(56) References Cited

U.S. PATENT DOCUMENTS

| 5,345,595 | A  | * | 9/1994  | Johnson   | H04L 63/1416 379/189 |
| 7,743,137 | B2 | * | 6/2010  | Sarwono   | H04L 12/1895 709/206 |
| 8,610,566 | B2 | * | 12/2013 | Sznaider  | G08B 21/10 340/539.11 |
| 2002/0120711 | A1 |  | 8/2002  | Bantz et al. | |
| 2006/0177058 | A1 | * | 8/2006  | Sarwono   | H04L 12/1895 380/211 |
| 2008/0184270 | A1 | * | 7/2008  | Cole      | H04M 3/42136 719/318 |
| 2014/0082645 | A1 | * | 3/2014  | Stern     | H04N 21/26258 725/13 |
| 2017/0316462 | A1 | * | 11/2017 | McConnell | G06Q 30/0269 |

* cited by examiner

*Primary Examiner* — Diem K Cao
(74) *Attorney, Agent, or Firm* — Alston & Bird LLP (57) ABSTRACT

An event-driven system, method and computer program product are provided to selectively generate events in response to receipt of data elements. The event-driven system includes processing circuitry configured to identify, in response to receipt of one or more data elements, an event that is impacted by the one or more data elements. The processing circuitry is also configured to determine whether at least a threshold number of consumers are currently listening for the event. In an instance in which at least a threshold number of consumers are currently listening for the event, the processing circuitry is configured to perform one or more computations based upon the one or more data elements to generate the event. Otherwise, however, the processing circuitry is configured to at least defer the one or more computations that would be performed upon the one or more data elements to generate the event.

17 Claims, 4 Drawing Sheets

EVENT-DRIVEN SYSTEM AND METHOD FOR SELECTIVELY PERFORMING COMPUTATIONS

TECHNOLOGICAL FIELD

An example embodiment of the present invention relates generally to an event-driven system and method for selectively performing computations to generate events based upon the consumers currently listening for the event in order to conserve and make efficient use of the processing resources.

BACKGROUND

Event-driven systems ingest data elements and, in response, perform a series of computations in order to generate events based at least in part upon the ingested data elements. Consumers of these event-driven systems may listen for the events in order to be informed and, in some instances, to respond based upon the events. As event-driven systems become larger, the event-driven systems must generally be capable of receiving a large number of data elements and, in turn, performing a very large number of computations in order to generate the resulting events. Consequently, an event-driven system may have a substantial processing load and, as such, a substantial investment may need to be made in processing resources in order to generate the events in a timely manner.

Some event-driven systems have performed batch-based computations on all incoming data elements. By performing batch-based computations on all incoming data elements, these event-driven systems may reduce, at least somewhat, the processing resources that are required to generate the events, but do so at the cost of latency in the generation of the events. As such, consumers are not provided with real-time or even very timely generation of the events in at least some instances of event-driven systems that rely upon batch-based computation. Other event-driven systems operate in real-time or near real-time. These event-driven systems receive the data elements and generate the events with near real-time calculations. Although the events are generated in a more timely manner so as to satisfy the consumer, the performance of the multitude of calculations required to generate the events in real-time requires an investment in substantially greater processing resources. In particular, real-time event-driven systems, such as real-time streaming systems, may experience substantial compute peaks (the maximum consumption of processing resources by an event-driven system) in response to the receipt of a substantial amount of data elements at approximately the same time or in the same relatively small time period which, in turn, causes a need to perform a substantial number of calculations at approximately the same time in order to generate the resulting events in a timely manner. This compute peak may therefore require real-time event-driven systems to invest even more greatly in processing resources.

As such, an event-driven system for the generation of events based upon the receipt of data elements provides valuable information to consumers of the event, but suffers from either increased latency as an increasing number of computations must be performed to generate an increased number of events or increased costs as more processing resources are required to satisfy the greater compute peaks.

BRIEF SUMMARY

An event-driven system, method and computer program product are provided in order to selectively generate events in response to receipt of data elements. In this regard, an event-driven system, method and computer program product may condition the performance of the computations necessary to generate the event upon the presence of consumers who are listening for the event and, in some embodiments, upon the relative importance of the resulting event. As such, some of the computations may be deferred and those deferred computations may subsequently be performed, such as in an off-peak processing period or in response to a consumer beginning to listen for the event. The event-driven system, method and computer program product of an example embodiment may therefore generate those events that are of importance or are of current interest, such as to consumers who are currently listening for the event, in real-time or near real-time while deferring generation of other events that are of lesser importance or are not the focus of current consumers. Thus, the processing resources of the event-driven system, method and computer program product may be conserved, such as by substantially reducing the compute peak, while still providing the consumers who are currently listening for events with the timely generation of events based upon the data elements that are received.

In an example embodiment, an event-driven system is provided that includes processing circuitry configured to identify, in response to receipt of one or more data elements, an event that is impacted by the one or more data elements. The processing circuitry is also configured to determine whether at least a threshold number of consumers are currently listening for the event. In an instance in which at least a threshold number of consumers are currently listening for the event, the processing circuitry is configured to perform one or more computations based upon the one or more data elements to generate the event. However, in an instance in which less than the threshold number of consumers are currently listening for the event, the processing circuitry is configured to at least defer the one or more computations that would be performed upon the one or more data elements to generate the event.

The processing circuitry of an example embodiment is further configured, in an instance in which less than the threshold number of consumers are currently listening for the event, to cause the event to be flagged as an event that is impacted by the one or more data elements, but that has not yet been generated. The processing circuitry of an example embodiment is configured to defer the one or more computations by performing the one or more computations following a delay after receipt of the one or more data elements and in accordance with a predefined schedule. For example, the processing circuitry may be configured to perform the one or more computations to generate a plurality of events in a batch process. The processing circuitry of an example embodiment is configured to defer the one or more computations by determining that the event has been requested prior to being generated and, in response to the event being requested, performing the one or more computations based upon the one or more data elements to generate the event. The processing circuitry of an example embodiment is configured to defer the one or more computations for a period of time that is based upon a number of consumers that are currently listening for the event.

In an example embodiment, a plurality of events of different relative importance are impacted by the one or more data elements. As such, the one or more computations are performed upon the one or more data elements in accordance with this embodiment in order to generate at least one of the plurality of events of greater relative importance regardless of whether the threshold number of consumers are currently listening for the at least one of the plurality of events. However, in this example embodiment, the one or more computations that would be performed upon the one or more data elements to generate at least another one of the plurality of events of lesser relative importance are deferred in an instance in which less than the threshold number of consumers are currently listening for the at least another one of the plurality of events.

In another example embodiment, a method is provided for selectively generating events based upon one or more data elements. The method of this example embodiment includes identifying, in response to receipt of one of more data elements, an event that is impacted by the one or more data elements. The method of this example embodiment determines whether at least the threshold number of consumers are currently listening for the event. In an instance in which at least the threshold number of consumers are currently listening for the event, the method performs, with processing circuitry, one or more computations based upon the one or more data elements to generate the event. However, in an instance in which less than the threshold number of consumers are currently listening for the event, the method at least defers the one or more computations that would be performed upon the one or more data elements to generate the event.

In an instance in which less than the threshold number of consumers are currently listening for the event, the method of an example embodiment also includes causing the event to be flagged as an event that is impacted by the one or more data elements, but that has not yet been generated. In regards to deferring the one or more computations, the method of an example embodiment performs the one or more computations following a delay after receipt of the one or more data elements in accordance with a predefined schedule. In this regard, the method may perform the computations to generate the plurality of events in a batch process. In another example embodiment, the method defers the one or more computations by determining that the event has been requested prior to being generated and, in response to the event being requested, performing the one or more computations based upon the one or more data elements to generate the event. In an example embodiment, the method defers the one or more computations for a period of time that is based upon a number of consumers that are currently listening for the event.

In an example embodiment, a plurality of events of different relative importance are impacted by the one or more data elements. In this embodiment, the one or more computations are performed upon the one or more data elements to generate at least one of the plurality of events of greater relative importance regardless of whether the threshold number of consumers are currently listening for the at least one of the plurality of events. However, one or more computations that would have been performed upon the one or more data elements to generate at least another one of the plurality of events of lesser relative importance are deferred in an instance in which less than the threshold number of consumers are currently listening to the at least another one of the plurality of events.

In yet another example embodiment, a computer program product for selectively generating events based upon one or more data elements is provided. The computer program product includes at least one non-transitory computer-readable storage medium having computer-executable program code portion stored therein. The computer-executable program code portions include program code instructions for identifying, in response to receipt of one or more data elements, an event that is impacted by the one or more data elements. The computer-executable program code instructions also include program code instructions for determining whether at least a threshold number of consumers are currently listening for the event. The computer-executable program code instructions further include program code instructions for performing, in an instance in which at least a threshold number of consumers are currently listening for the event, one or more computations based upon the one or more data elements to generate the event. Additionally, the computer-executable program code portions include program code instructions for at least deferring, in an instance in which less than the threshold number of consumers are currently listening for the event, the one or more computations that would be performed upon the one or more data elements to generate the event.

The computer-executable program code portions of an example embodiment also include program code instructions for, in an instance in which less than the threshold number of consumers are currently listening for the event, causing the event to be flagged as an event that is impacted by the one or more data elements but that has not yet been generated. In an example embodiment, the program code instructions for deferring the one or more computations include program code instructions for performing the one or more computations following a delay after receipt of the one or more data elements and in accordance with a predefined schedule. In another example embodiment, the program code instructions for deferring the one or more computations include program code instructions for determining that the event has been requested prior to being generated and, in response to the event being requested, performing the one or more computations based upon the one or more data elements to generate the event. In an example embodiment, the program code instructions for deferring the one or more computations include program code instructions for deferring the one or more computations for a period of time that is based upon a number of consumers that are currently listening for the event.

A plurality of events of different relative importance may be impacted by the one or more data elements. As such, one or more computations may be performed upon the one or more data elements to generate at least one of the plurality of events of greater relative importance regardless of whether the threshold number of consumers are currently listening for at least one of the plurality of events. However, one or more computations that would be performed upon the one or more data elements to generate at least another one of the plurality of events of lesser relative importance may be deferred in an instance in which less than the threshold number of consumers are currently listening for the at least another one of the plurality of events.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

An event-driven system, method and computer program product are provided in order to selectively generate events based upon one or more data elements. Event-driven systems may be utilized in a wide variety of industries and, as a result, a plethora of different applications. By way of example, event-driven systems may be utilized in conjunction with manufacturing processes, governmental intelligence collection and analysis, and logistics analysis to name but a few. In each of these applications, a plurality of different types of data elements are received and, following the performance of a plurality of computations, a plurality of events are generated based upon the data elements. The types of data elements that are received, the computations that are performed and the events that are generated widely vary, however, depending upon the application, as each industry and, in turn, each application within an industry generally has a unique set of data elements, computations and events.

Figure 1:
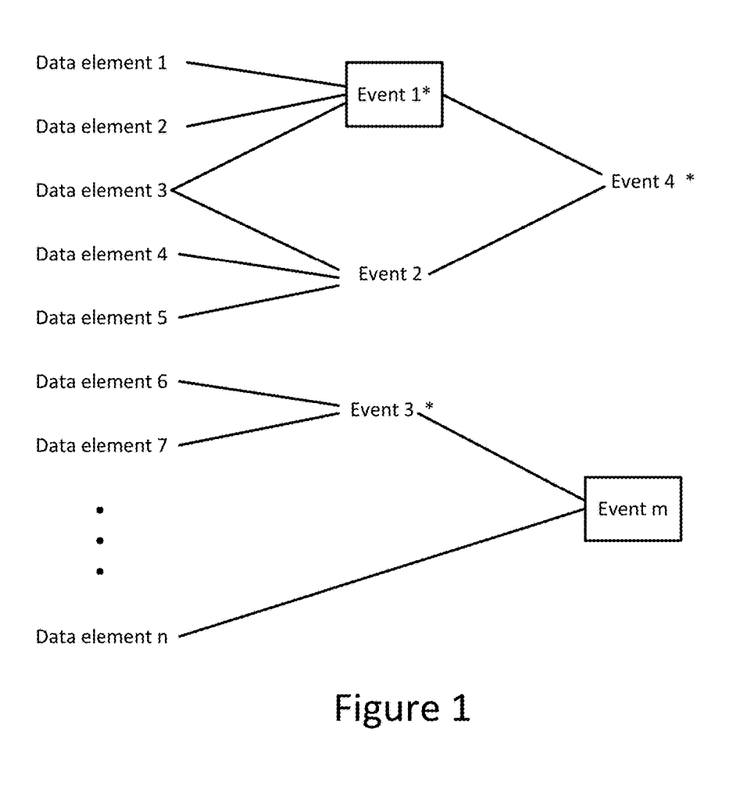
FIG. 1 is a graphical representation of a plurality of data elements and a plurality of events that may be generated from the plurality of data elements by the performance of a plurality of computations in accordance with an example embodiment of the present invention.

By way of example, the healthcare industry includes a variety of applications that receive data elements, perform numerous computations and generate events based upon those computations. For example, applications within the healthcare industry are configured to calculate clinical quality measures, perform secondary aggregation of medication lists in a health record view, perform complex financial calculations, etc. with each of these applications ingesting a relatively large amount of incoming data elements, performing a number of computations and then generating a plurality of events to be consumed by various consumers, such as physicians or other healthcare professionals, patients, payors or the like. In this regard, FIG. 1 depicts an example in which a wide variety of data elements, designated data element 1, data element 2 . . . data element n, are received. These data elements may be received from patients, from healthcare practices or from a variety of other sources. Various types of data elements may be received by the event-driven system. In an example embodiment, however, the data elements are representative of various health-related parameters for one or more patients. The health-related parameters may include, for example, the blood sugar reading of a patient, the temperature of a patient, the weight of the patient, the medications taken by a patient, the blood pressure of the patient, etc.

Based upon the data elements that are received, the event-driven system is configured to perform a plurality of computations based upon different combinations of the data elements in order to generate a plurality of events designated as event 1, event 2, . . . event m. As FIG. 1 illustrates, the computations and the resulting events may define complex dependencies in which some events, such as event 4, are dependent upon other events, such as events 1 and 2. Various types of events may be generated including various clinical quality measures. In at least some embodiments, the events may be of different relative importance. The relative importance of the events may be defined in various manners. In the embodiment of FIG. 1, events are identified in a binary fashion as either being of greater relative importance or of lesser relative importance with those events that are of greater relative importance depicted to be within a rectangle while those events of lesser relative importance are not circumscribed by a rectangle. However, other embodiments of the event-driven system may define the relative importance of the events in different manners, such as by assigning a numerical value of the relative importance, such as a value from 0 to 10 with 0 being an event of the least relative importance and 10 being an event of the greatest relative importance.

An event-driven system includes a plurality of consumers who listen for the events that are generated. Various types of consumers may subscribe or otherwise be permitted to listen to the events that are generated. For example, the consumers may include healthcare professionals who are remotely monitoring their patients, payers, etc. Typically, the consumers do not listen for every event generated by the event-driven system that may be generated based upon the data elements that are received by the event-driven system, but, instead, listen only to a certain subset of the events that are generated, such as the events to which a consumer has subscribed. This subset may be relatively small in relation to the numerous events that may be generated in response to the data elements that are received by the event-driven system. In this regard, FIG. 1 denotes the events for which consumers are currently listening with an asterisk such that those events that are not marked with an asterisk are not being currently listened to by a consumer. Of those events for which a consumer is not currently listening, consumers may subsequently begin listening for the event and request an update as to the events that have occurred during their absence. Or consumers may never request a particular event. In order to conserve processing resources and, in particular, to reduce the compute peak of the event-driven system, the event-driven system of an example embodiment is configured to defer the generation of those events for which no or at least only a few consumers are currently listening, but to continue to generate the events, such as in real-time or near real-time, for which a consumer or, in some embodiments, at least a threshold number of consumers, are currently listening. Thus, the event-driven system provides for timely delivery of events to consumers who are listening, while conserving processing resources with respect to the generation of events for which consumers are not currently listening.

The event-driven system may be configured in various manners. In an example embodiment depicted in FIG. 2, however, the event-driven system is embodied by a server or other computing device 10 that includes or is otherwise associated with and in communication with processing circuitry 12 that is configurable to perform functions in accordance with one or more example embodiments disclosed herein. In this regard, the processing circuitry may be configured to perform and/or control performance of one or more functionalities of the event-driven system or components thereof in accordance with various example embodiments, and thus may provide means for performing functionalities of the computing device. The processing circuitry may be configured to perform data processing, application execution and/or other processing and management services according to one or more example embodiments.

Figure 2:
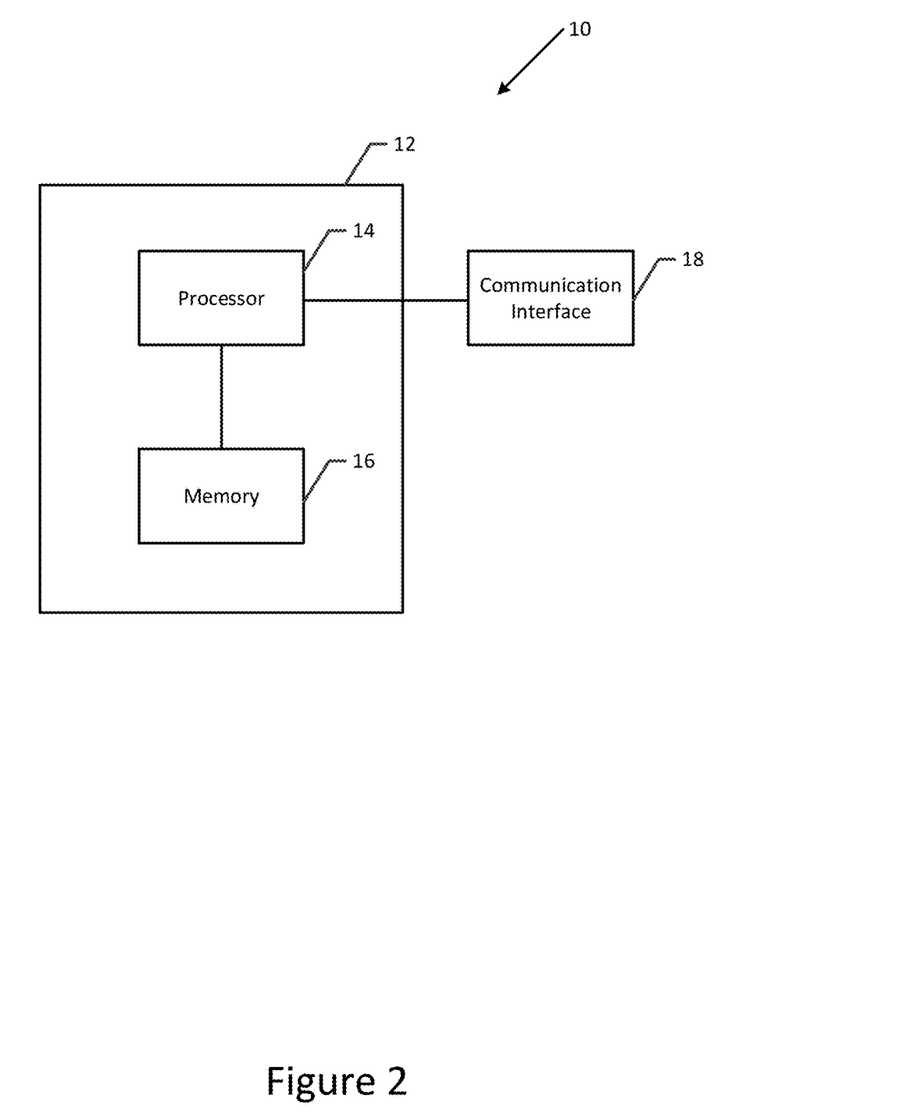
FIG. 2 is a block diagram of an event-driven system for selectively generating events based upon one or more data elements in accordance with an example embodiment of the present invention.

In some example embodiments, the processing circuitry 12 includes a processor 14 and, in some embodiments, such as that illustrated in FIG. 2, further includes memory 16. The processing circuitry may also be in communication with or otherwise control a communication interface 18 for communicating with other computing systems. As such, the processing circuitry may be embodied as a circuit chip (e.g., an integrated circuit chip) configured (e.g., with hardware, software or a combination of hardware and software) to perform operations described herein.

The processor 14 may be embodied in a number of different ways. For example, the processor may be embodied as various processing means such as one or more of a central processing unit, a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor may comprise a plurality of processors. The plurality of processors may be in operative communication with each other and may be collectively configured to perform one or more functionalities of the computing device as described herein. The plurality of processors may be embodied on a single computing device or distributed across a plurality of computing devices collectively configured to function as the computing device. In some example embodiments, the processor may be configured to execute instructions stored in the memory 16 or otherwise accessible to the processor. As such, whether configured by hardware or by a combination of hardware and software, the processor may represent an entity (e.g., physically embodied in circuitry—in the form of processing circuitry 12) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform one or more operations described herein.

The processing circuitry 12 may also include memory 16 as shown in FIG. 2. In some example embodiments, the memory may include one or more non-transitory memory devices such as, for example, volatile and/or non-volatile memory that may be either fixed or removable. In this regard, the memory may comprise a non-transitory computer-readable storage medium. It will be appreciated that while the memory is illustrated as a single memory, the memory may comprise a plurality of memories. The memory may be configured to store information, data, applications, instructions and/or the like for enabling the computing device to carry out various functions in accordance with one or more example embodiments. For example, the memory may be configured to buffer input data for processing by the processor 14. Additionally or alternatively, the memory may be configured to store instructions for execution by the processor. Among the contents of the memory, applications may be stored for execution by the processor in order to carry out the functionality associated with each respective application. In some cases, the memory may be in communication with the processor via a bus or buses for passing information among components of the computing device 10 of the event-driven system.

As noted above, the computing device 10 of the event-driven system of the embodiment of FIG. 2 also includes a communication interface 18. The communication interface is configured to communicate with one or more consumers in order to affect the delivery of messages, such as advising of the generation of events, thereto. Similarly, the communication interface may be in communication with one or more databases or other data repositories in order to store the events that are generated. Additionally, the communication interface of an example embodiment may be in communication with one or more sources of the data elements, such as the health information systems. The communication interface may be any means such as a device or circuitry embodied in either hardware or a combination of hardware and software that is configured to receive and/or transmit messages from sources to subscribers. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

The communication interface 18 may be configured to directly and/or indirectly communicate with the sources of the data elements and/or the consumers of the events in any of a number of different manners including, for example, any of a number of wireline or wireless communication or networking techniques. Examples of such techniques include, without limitation, Universal Serial Bus (USB), radio frequency (RF), Bluetooth (BT), infrared (IrDA), any of a number of different cellular (wireless) communication techniques such as any of a number of 2G, 2.5G, 3G, 4G or Long Term Evolution (LTE) communication techniques, local area network (LAN), wireless LAN (WLAN) techniques or the like. In accordance with various ones of these techniques, the communication interface can be coupled to and configured to communicate across one or more networks. The network(s) can comprise any of a number of different combinations of one or more different types of networks, including data and/or voice networks. For example, the network(s) can include one or more data networks, such as a LAN, a metropolitan area network (MAN), and/or a wide area network (WAN) (e.g., Internet), and include one or more voice networks, such as a public-switched telephone network (PSTN).

Figure 3:
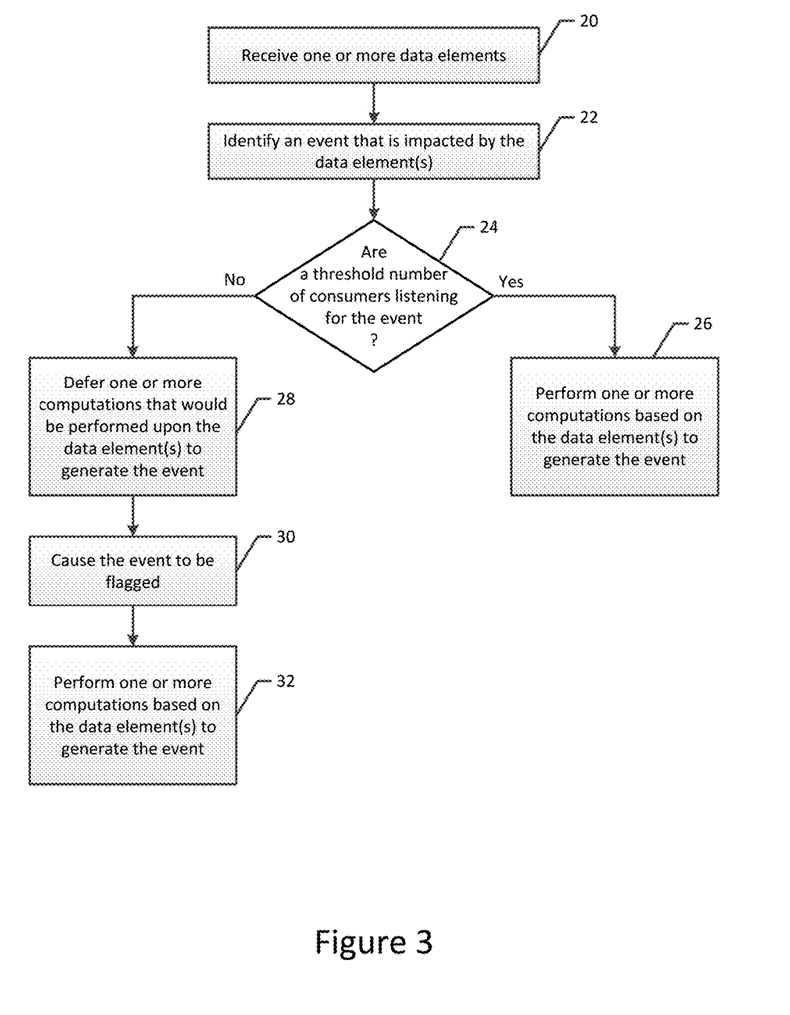
FIG. 3 is a flowchart illustrating the operations performed, such as by the event-driven system of FIG. 1, in accordance with an example embodiment of the present invention.

Regardless of the manner in which the event-driven system is embodied, the operations performed by an event-driven system in accordance with an example embodiment are depicted in FIG. 3. As shown, the event-driven system of this example embodiment includes means, such as the processing circuitry 12, the processor 14, the communication interface 18 or the like, for receiving one or more data elements, such as those described above. See block 20 of FIG. 3. The data elements may be received from various sources including, for example, from patients, health care professionals, health information systems, etc. Upon receipt, the data elements may be stored, such as in memory 16. In response to receipt of the one or more data elements, the event-driven system includes means, such as the processing circuitry, the processor or the like, for identifying an event that is impacted by the one or more data elements. See block 22. In an example embodiment, the processing circuitry is configured to maintain or otherwise have access to a mapping, such as in memory, of the plurality of different types of data elements that may be received and the one or more events that may be impacted by the respective data elements. The manner in which the events are impacted will likely be dependent upon the value of the data element, but the mapping identifies those events that may be impacted without consideration of the value of the respective data element. With respect to the example of FIG. 1, the mapping may identify that data element 1 impacts Events 1 and 4, while data element 3 impacts Events 1, 2 and 4.

In addition to monitoring for receipt of the data elements, the event-driven system also monitors the consumers and the events to which the consumers are listening. In this regard, the communication interface 18 is configured to permit consumers to listen to, such as by having subscribed to, one or more events generated by the event-driven system. As such, the event-driven system includes means, such as the processing circuitry 12, the processor 14, the communication interface or the like, for determining whether at least a threshold number of consumers are currently listening for the event that is impacted by one or more data elements that have been received. See block 24 of FIG. 3. The threshold number of consumers may be predefined and, as such, may be any of a variety of different numbers of consumers, such as a single consumer or a predetermined plurality of consumers, depending upon the manner in which the event-driven system is configured. Additionally, the threshold number of consumers may be the same for every event or the threshold number of consumers may be different for some events than for other events based upon the configuration of the event-driven system.

In an instance in which at least the threshold number of consumers are currently listening for the event, the event-driven system includes means, such as the processing circuitry 12, the processor 14 or the like, for performing the one or more computations based upon the one or more data elements so as to generate the event. See block 26 of FIG. 3. Thus, in an instance in which at least the threshold number of consumers are currently listening for the event, the event-driven system generates the event in a timely manner with little, if any, latency, such as by generating the event in real-time or near real-time. As such, the processing resources may be dedicated in real-time or near real-time to those events for which at least the threshold number of consumers are currently listening.

Returning to decision block 24 of FIG. 3, however, in an instance in which less than the threshold number of consumers are currently listening for the event, the event-driven system includes means, such as the processing circuitry 12, the processor 14 or the like, for deferring the one or more computations that would be performed upon the one or more data elements to generate the event. See block 28. Thus, in an instance in which no consumers are currently listening for the event or in which only a few consumers, less than the threshold number of consumers, are currently listening for the event, processing resources may currently be conserved by deferring the one or more computations that otherwise would need to be performed to generate the event. Such a deferral increases the latency associated with the generation of the event, but does so with an understanding that the increased latency had a minimal impact since less than the threshold number of consumers are currently listening for the event. With reference to FIG. 1, in an instance in which data element 3 has been received and at least the threshold number of consumers are listening for Event 4, the computations involving data elements 1-5 may be performed to generate Events 1 and 2 and, in turn, Event 4. However, if data element 3 were received and at least the threshold number of consumers were listening for Event 1, but not for Events 2 or 4, the computations involving data elements 1-3 may be performed to generate Event 1, but the computations that could be performed to generate Events 2 and 4 need not be performed, at least not currently.

In an instance in which less than the threshold number of consumers are currently listening for the event and the one or more computations that would be performed to generate the event are at least deferred, the event-driven system may include means, such as the processing circuitry 12, the processor 14, the memory 16 or the like, for causing the event (for which the generation has been at least deferred) to be flagged as an event that is impacted by the one or more data elements but that has not yet been generated. See block 30 of FIG. 3. By flagging the event, a record is maintained to indicate that the current value of the event, if any, may be out of date since data elements have been received that may impact the event, but that have not yet been fully processed. In this regard, the flagging of the event indicates that the computations that have been deferred must be performed in order to generate the event, such as by updating the event, prior to providing the event to a consumer. The processing circuitry may be configured to flag the event in various manners, such as by modifying a record stored in memory relating to the event so as to indicate that the event is impacted by one or more data elements that have been received. As described below, the event-driven system may also include means, such as the processing circuitry, the processor or the like, for subsequently performing the one or more computations that have been deferred for at least some events, following some period of delay. See block 32.

Figure 4:
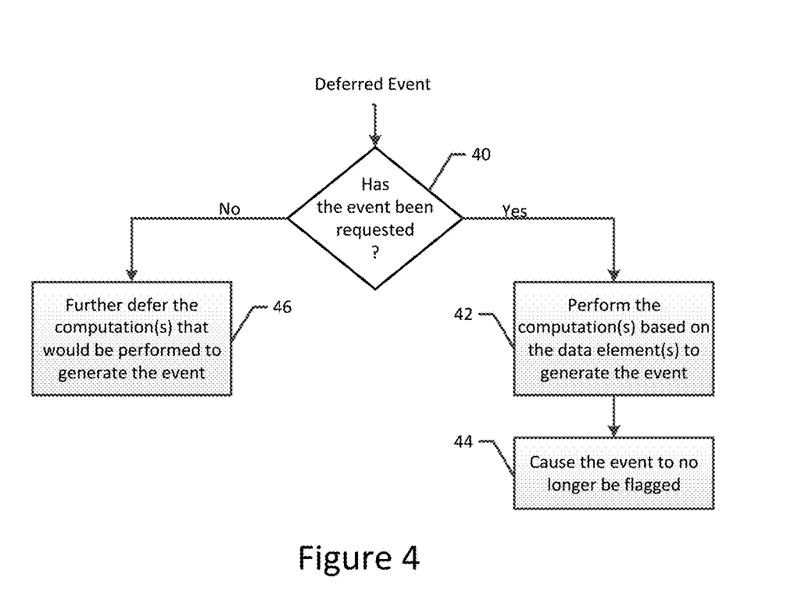
FIG. 4 is a flowchart of the operations performed, such as by the event-driven system of FIG. 1, in relation to the deferral of one or more computations in accordance with an example embodiment of the present invention.

The subsequent generation of events for which one or more computations have been deferred may be performed in various manners. In an example embodiment depicted in FIG. 4, the computations are deferred until such time that the event has been requested by a consumer, such as by a consumer who has subscribed to the event subsequently logging into the event-driven system. In this example embodiment, the event-driven system includes means, such as the processing circuitry 12, the processor 14, the communication interface 18 or the like, for determining that the event has been requested prior to the event being generated. See block 40 of FIG. 4. In response to the event being requested, such as by consumer who has subscribed to the event and who has now logged into the system, the event-driven system includes means, such as the processing circuitry, the processor or the like, for performing the one or more computations based upon the one or more data elements that were previously received in order to generate the event. See block 42. Once the event has been generated, the event is no longer flagged. Thus, the event-driven system of an example embodiment includes means, such as the processing circuitry, the processor, the memory 16 or the like, for modifying the record in memory that is associated with the event so as to remove the flag that was previously placed as a result of the prior deferral of the one or more computations required to generate the event. See block 44. As shown in block 46, in an instance in which the deferred event has not been requested, the event-driven system of this example embodiment also includes means, such as the processing circuitry, the processor or the like, for further deferring the one or more computations that would be performed in order to generate the event. Since the computations required to generate the event may be deferred in the example embodiment depicted in FIG. 4 until a consumer requests the event, the computations required to generate the event need never be performed in some instances, thereby avoiding unnecessary computations and further conserving processing resources.

In another embodiment, the generation of the event is not dependent upon a request for the event by consumer (or at least is not only dependent upon a request for the event by a consumer), but, instead, the computations required to generate the event may be deferred from the time at which the data elements are received to a later time, such as an off-peak time, in order to reduce the compute peak of the event-driven system and to utilize the otherwise under-utilized processing resources of the event-driven system during an off-peak time. In this example embodiment, the processing circuitry 12 is configured to defer the one or more computations by performing the one or more computations following a delay after receipt of the one or more data elements and in accordance with a predefined schedule. In this example embodiment, the efficiency with which the processing resources are utilized may be further enhanced by performing the computations to generate the plurality of events in a batch process.

In an example embodiment, the processing circuitry 12 is configured to defer the one or more computations for a period of time that is based upon the number of consumers that are currently listening for the event. Thus, in an instance in which fewer than the threshold number of consumers are currently listening for the event, the period of time for which the one or more computations are deferred is dependent upon the number of consumers who are currently listening for the event with the period of time being inversely proportional to the number of consumers who are currently listening for the event. Thus, as more consumers (albeit still fewer than the threshold number of consumers) are currently listening for the event, the period of time for which the one or more computations is deferred is reduced and the one or more deferred computations are performed sooner in order to generate the event than in an instance in which a smaller number of consumers are currently listening for the event and the period of time for which the one or more computations is deferred is increased. Thus, the processing circuitry of the event-driven system of this example embodiment may even more closely associate the utilization of processing resources with the demand for the resulting event.

As described above, the event-driven system, method and computer program product may make more efficient utilization of the processing resources while still generating events in a timely manner, at least in instances in which the threshold number of consumers are currently listening for the event. In this regard, the event-driven system, method and computer program product may reduce the compute peak and may, instead, shift some of the processing to off-peak times or may simply avoid performing some computations altogether that would generate events that no consumers ever request.

In an example embodiment, the event-driven system not only takes into account the consumers who are currently listening for an event, but also the relative importance of an event. The relative importance of an event may be defined in various manners including, for example, by the system administrator of the event-driven system and/or by the consumers of the events. By taking into account the relative importance of the events, the event-driven system of this example embodiment may generate events that are of greater relative importance regardless of whether the least threshold number of consumers are currently listening for the event. By generating the events of greater importance, these events may subsequently be provided to consumers with little, if any, latency and certainly less latency than events of lesser importance that are deferred in instances in which less than the threshold number of consumers are listening for the events. As such, the availability of the events of greater importance may be improved by the event-driven system of this example embodiment.

Figure 5:
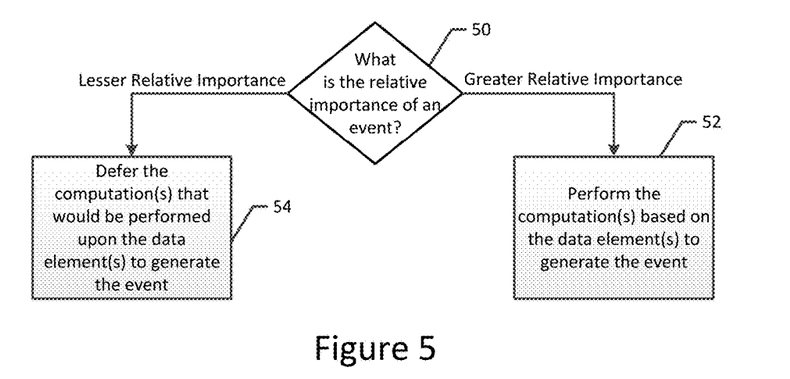
FIG. 5 is a flowchart illustrating the operations performed, such as by the event-driven system of FIG. 1, in order to selectively defer computations based upon the relative importance of the resulting event in accordance with an example embodiment of the present invention.

In this example embodiment, the event-driven system may include means, such as the processing circuitry 12, the processor 14 or the like, for determining the relative importance of each event impacted by a newly received data element. See block 50 of FIG. 5. In this regard and in recognition that a plurality of events of different relative importance may be impacted by the one or more data elements that are received by the event-driven system, the event-driven system of this example embodiment includes means, such as the processing circuitry, the processor or the like, for performing the one or more computations upon the one or more data elements to generate at least one and, more typically, each of the plurality of events of greater relative importance regardless of whether the threshold number of consumers are currently listening for at least one of the plurality of events. See block 52. Thus, the events of greater relative importance may be generated in real-time or near real-time regardless of whether any consumer is currently listening for the event. With respect to FIG. 1, Events 1 and m are designated to be of greater importance. Thus, upon receipt of data elements 1 and 6, the event-driven system may be configured to perform the computations necessary to generate Events 1 and m (including the generation of Event 3 in order to generate Event m) without consideration as to the number of consumers currently listening for Events 1, 3 and m.

The determination as to whether an event is of greater relative importance in comparison to lesser relative importance may be established in various manners. As described above, the events may simply be designated as being of either greater relative importance or lesser relative importance. Alternatively, the relative importance of the events may be defined in other manners, such as in accordance with a numerical scale. In this example embodiment, an importance threshold may be defined such that events that satisfy the importance threshold are considered of greater relative importance, while events that fail to satisfy the importance threshold are considered of lesser relative importance. As shown in block 54, the event-driven system of this example embodiment may also include means, such as the processing circuitry 12, the processor 14 or the like, for deferring the one or more computations that would have been performed upon the one or more data elements to generate at least another one and, more typically, each of the plurality of events of less relative importance in an instance in which less than the threshold number of consumers are currently listening for the event(s). See block 54 of FIG. 5. Thus, events of lesser relative importance are not necessarily generated in real-time or near real-time, but are, instead, processed in a manner described above in conjunction with the embodiment of FIGS. 3 and 4 in which the generation of the event or the deferral of the generation of event is dependent upon the number of consumers who are currently listening for the respective event and any subsequent request for a deferred event. Consequently, the event-driven system, method and computer program product conserve processing resources while still providing timely notification of those events that are of importance and/or for which consumers are currently listening.

As described above, FIGS. 3-5 are flowcharts of an event-driven system, method and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices 16 and executed by processor 14 of the computer device 10 of FIG. 2. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowcharts support combinations of means for performing the specified functions and combinations of steps for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processing circuitry 12 may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An event-driven system comprising processing circuitry configured to:
    in response to receipt of one or more data elements, identify an event that is impacted by the one or more data elements;
    determine whether at least a threshold number of consumers are currently listening for the event;
    in an instance in which at least the threshold number of consumers are currently listening for the event, perform one or more computations based upon the one or more data elements to generate the event; and
    in an instance in which less than the threshold number of consumers are currently listening for the event, at least defer the one or more computations that would be performed upon the one or more data elements to generate the event,
    wherein the processing circuitry is configured to defer the one or more computations in the instance in which less than the threshold number of consumers are currently listening for the event by subsequently performing the one or more computations following a delay after receipt of the one or more data elements with the delay based upon a number of consumers that are currently listening for the event, wherein the delay defines a period of time for which the one or more computations are deferred that is based upon the number of consumers that are currently listening for the event,
    wherein performing the one or more computations comprises performing the one or more computations based upon combinations of the one or more data elements by performing one or more calculations or by performing aggregation, wherein the event is dependent upon one or more other events such that generation of the event causes generation of the one or more other events upon which the event is dependent, and wherein the event and the one or more other events are configured to be subscribed or listened to by one or more consumers.

2. An event-driven system according to claim 1 wherein the processing circuitry is further configured, in an instance in which less than the threshold number of consumers are currently listening for the event, to cause the event to be flagged as an event that is impacted by the one or more data elements but that has not yet been generated.

3. An event-driven system according to claim 1 wherein the processing circuitry is configured to perform the one or more computations in accordance with a predefined schedule by performing the computations to generate a plurality of events in a batch process.

4. An event-driven system according to claim 1 wherein the processing circuitry is configured to defer the one or more computations by:
   determining that the event has been requested prior to being generated; and
   in response to the event being requested, performing the one or more computations based upon the one or more data elements to generate the event.

5. An event-driven system according to claim 1 wherein a plurality of events of different relative importance are impacted by the one or more data elements, and wherein the one or more computations are performed upon the one or more data elements to generate at least one of the plurality of events of greater relative importance regardless of whether the threshold number of consumers are currently listening for the at least one of the plurality of events but the one or more computations that would be performed upon the one or more data elements to generate at least another one of the plurality of events of lesser relative importance are deferred in an instance in which less than the threshold number of consumers are currently listening for the at least another one of the plurality of events.

6. An event-driven system according to claim 1 wherein the delay has an inverse relationship to the number of consumers that are currently listening for the event such that larger numbers of consumers that are currently listening for the event results in shorter delays than smaller numbers of consumers that are currently listening for the event.

7. A method for selectively generating events based upon one or more data elements, the method comprising:
   in response to receipt of one or more data elements, identifying an event that is impacted by the one or more data elements;
   determining whether at least a threshold number of consumers are currently listening for the event;
   in an instance in which at least the threshold number of consumers are currently listening for the event, performing, with processing circuitry, one or more computations based upon the one or more data elements to generate the event; and
   in an instance in which less than the threshold number of consumers are currently listening for the event, at least deferring the one or more computations that would be performed upon the one or more data elements to generate the event, wherein deferring the one or more computations in the instance in which less than the threshold number of consumers are currently listening for the event comprises subsequently performing the one or more computations following a delay after receipt of the one or more data elements with the delay based upon a number of consumers that are currently listening for the event, wherein the delay defines a period of time for which the one or more computations are deferred that is based upon the number of consumers that are currently listening for the event, wherein performing the one or more computations comprises performing the one or more computations based upon combinations of the one or more data elements by performing one or more calculations or by performing aggregation, wherein the event is dependent upon one or more other events such that generation of the event causes generation of the one or more other events upon which the event is dependent, and wherein the event and the one or more other events are configured to be subscribed or listened to by one or more consumers.

8. A method according to claim 7 further comprising, in an instance in which less than the threshold number of consumers are currently listening for the event, causing the event to be flagged as an event that is impacted by the one or more data elements but that has not yet been generated.

9. A method according to claim 7 wherein performing the one or more computations in accordance with a predefined schedule comprises performing the computations to generate a plurality of events in a batch process.

10. A method according to claim 7 wherein deferring the one or more computations comprises:
    determining that the event has been requested prior to being generated; and
    in response to the event being requested, performing the one or more computations based upon the one or more data elements to generate the event.

11. A method according to claim 7 wherein a plurality of events of different relative importance are impacted by the one or more data elements, and wherein the one or more computations are performed upon the one or more data elements to generate at least one of the plurality of events of greater relative importance regardless of whether the threshold number of consumers are currently listening for the at least one of the plurality of events but the one or more computations that would be performed upon the one or more data elements to generate at least another one of the plurality of events of lesser relative importance are deferred in an instance in which less than the threshold number of consumers are currently listening for the at least another one of the plurality of events.

12. A method according to claim 7 wherein the delay has an inverse relationship to the number of consumers that are currently listening for the event such that larger numbers of consumers that are currently listening for the event results in shorter delays than smaller numbers of consumers that are currently listening for the event.

13. A computer program product for selectively generating events based upon one or more data elements, the computer program product comprising at least one non-transitory computer-readable storage medium having computer-executable program code portions stored therein, the computer-executable program code portions comprising program code instructions for:

in response to receipt of one or more data elements, identifying an event that is impacted by the one or more data elements;

determining whether at least a threshold number of consumers are currently listening for the event;

in an instance in which at least the threshold number of consumers are currently listening for the event, performing one or more computations based upon the one or more data elements to generate the event; and in an instance in which less than the threshold number of consumers are currently listening for the event, at least deferring the one or more computations that would be performed upon the one or more data elements to generate the event, wherein the program code instructions for deferring the one or more computations in the instance in which less than the threshold number of consumers are currently listening for the event comprise program code instructions for subsequently performing the one or more computations following a delay after receipt of the one or more data elements with the delay based upon a number of consumers that are currently listening for the event, wherein the delay defines a period of time for which the one or more computations are deferred that is based upon the number of consumers that are currently listening for the event, wherein performing the one or more computations comprises performing the one or more computations based upon combinations of the one or more data elements by performing one or more calculations or by performing aggregation, wherein the event is dependent upon one or more other events such that generation of the event causes generation of the one or more other events upon which the event is dependent, and wherein the event and the one or more other events are configured to be subscribed or listened to by one or more consumers.

14. A computer program product according to claim 13 wherein the computer-executable program code portions further comprise program code instructions for, in an instance in which less than the threshold number of consumers are currently listening for the event, causing the event to be flagged as an event that is impacted by the one or more data elements but that has not yet been generated.

15. A computer program product according to claim 13 wherein the program code instructions for deferring the one or more computations comprise program code instructions for:

determining that the event has been requested prior to being generated; and in response to the event being requested, performing the one or more computations based upon the one or more data elements to generate the event.

16. A computer program product according to claim 13 wherein a plurality of events of different relative importance are impacted by the one or more data elements, and wherein the one or more computations are performed upon the one or more data elements to generate at least one of the plurality of events of greater relative importance regardless of whether the threshold number of consumers are currently listening for the at least one of the plurality of events but the one or more computations that would be performed upon the one or more data elements to generate at least another one of the plurality of events of lesser relative importance are deferred in an instance in which less than the threshold number of consumers are currently listening for the at least another one of the plurality of events.

17. A computer program product according to claim 13 wherein the delay has an inverse relationship to the number of consumers that are currently listening for the event such that larger numbers of consumers that are currently listening for the event results in shorter delays than smaller numbers of consumers that are currently listening for the event.

\* \* \* \* \*